US008138931B2

(12) United States Patent
Keast et al.

(10) Patent No.: US 8,138,931 B2
(45) Date of Patent: Mar. 20, 2012

(54) DIAGNOSTIC AND RESPONSE SYSTEMS AND METHODS FOR FLUID POWER SYSTEMS

(75) Inventors: Geoffrey Richard Keast, Cambs (GB); Michael H. Ellis, Denver, CO (US); Jonathan Clark Swift, Cambridge (GB); Layne Railsback, Brighton, CO (US); Donald R. Gilbreath, Castle Rock, CO (US)

(73) Assignee: The Gates Corporation, Denver, CO (US)

( * ) Notice: Subject to any disclaimer, the term of this patent is extended or adjusted under 35 U.S.C. 154(b) by 774 days.

(21) Appl. No.: 12/290,171

(22) Filed: Oct. 28, 2008

(65) Prior Publication Data

US 2010/0102974 A1 Apr. 29, 2010

(51) Int. Cl.

| | |
|---|---|
| ***G08B 21/00*** | (2006.01) |
| ***G01K 1/00*** | (2006.01) |
| ***G01L 7/00*** | (2006.01) |
| ***G01C 9/00*** | (2006.01) |
| ***G06F 11/30*** | (2006.01) |

(52) U.S. Cl. ........ 340/603; 340/606; 340/608; 340/611; 702/130; 702/138; 702/151; 702/183; 703/2; 703/9; 73/40.5 R

(58) Field of Classification Search ........................ None
See application file for complete search history.

(56) References Cited

U.S. PATENT DOCUMENTS 5,343,737 A * 9/1994 Baumoel .................... 73/40.5 R
7,015,810 B2 * 3/2006 Su ............................ 340/539.11
2004/0129092 A1 7/2004 Dietzel
2007/0156373 A1 * 7/2007 Yamashita et al. ............ 702/182
2010/0126727 A1 * 5/2010 Vinegar et al. ................ 166/302

FOREIGN PATENT DOCUMENTS

DE 101 38 777 A1 2/2003
EP 2 006 660 A2 6/2008
JP 2005299701 10/2005
WO WO 2006/002454 A1 1/2006

OTHER PUBLICATIONS

Notification of Transmittal of the International Search Report and the Written Opinion of the International Searching Authority Dated Apr. 14, 2010.
SAE The Engineering Society for Advancing Mobility Land Sea Air and Space International, REV Mar. 2001, Issued Oct. 1988, Revised Mar. 2001, Superseding J1927 Jul. 1993, "Cumulative Damage Analysis for Hydraulic Hose Assemblies", 12 pages.

* cited by examiner

*Primary Examiner* — Julie Lieu
(74) *Attorney, Agent, or Firm* — T. A. Dougherty, Esq.; J. A. Thurnau, Esq.; P. N. Dunlap, Esq.

(57) ABSTRACT

Diagnostic and response systems and methods for a fluid power system acquire data from pressure and temperature sensors disposed in the fluid power system, analyze the data in a failure algorithm to build a history of cumulative damage to hoses in the fluid power system, communicates an indication of potential imminent hose failure to a central location when a level of the cumulative damage indicates imminent failure of a hose, analyze the information at the central location to determine an appropriate response, and transmit information about the fluid power system, including location, and identification of the hose about to fail to a response unit. The response unit responds to the location and replaces the component prior to failure, or the communication might include information that the hose has failed, such that the response unit replaces the failed hose to return the fluid power system to normal operation.

42 Claims, 6 Drawing Sheets

DIAGNOSTIC AND RESPONSE SYSTEMS AND METHODS FOR FLUID POWER SYSTEMS

CROSS-REFERENCE TO RELATED APPLICATION

This application is related to concurrently filed U.S. patent application Ser. No. 12/290,173, of the same title, which is incorporated herein by reference.

BACKGROUND OF THE INVENTION

1. Field of the Invention

This invention relates generally to fluid power systems and components, more particularly to the monitoring and maintenance of such systems, and specifically to diagnostic and response systems and methods for fluid power systems and components, such as hoses.

2. Description of the Prior Art

The principal of modern diagnostic systems is to use sensing technology and software to read and interpret real world events and communicate the data to alert users to situations that may require some form of intervention. Diagnostic systems are fundamental to equipment performance and longevity in the automotive, fleet transportation and aerospace industries. Diagnostic systems which communicate fault warning information are well known in a number of industries, such as the automotive industry, the oilfield industry, the rail transport industry and the trucking industry. In contrast, hydraulic, or fluid power, equipment components, and particularly fluid power hoses, are service replaceable components which give little or no warning of imminent failure and for which no reliable means of imminent failure detection exits. Fluid power system failures, particularly hose failures, can lead to expensive downtime, oil spillage, and lost revenue and project delays.

Cumulative damage is a fluid power industry-wide understood measure used for estimation of hose life. Cumulative damage formulae for designing fluid power systems exist and an example is specified in SAE J1927. This cumulative damage formulae estimates the cumulative damage of a hose based upon pressure impulse exposure history. However, SAE J1927 is primarily is intended to provide the hydraulic system analyst with a procedure which will assist in the selection and use of high-pressure wire reinforced hydraulic hose assemblies. Hence, SAE J1927 or other methodologies fail to provide a means for diagnosing and responding to fluid power system incremental damage and failures in real-time.

SUMMARY

The present invention is directed to systems and methods which are able to indicate a potential fluid power system problem on a machine before it occurs, communicate the information, and in certain embodiments provide a service response direct to the machine, thus closing a real-time diagnostics and response loop. In particular, embodiments of the present invention employ a predictive algorithm to determine when hose life is nearing its end. Such embodiments then transmit the information together with vehicle specification, system details and vehicle ground position. The information is then communicated through a pre-determined communication channel, which in turn precipitates a response to the potential failure site (i.e. by a service van) to fix the problem before a failure and downtime occurs.

Thus, a key difference between the present systems and methods and diagnostic regimes employed in other industries is that the present systems and methods communicate potential fluid power system faults and, where appropriate, vehicle/equipment location. The present systems and methods also analyze data to organize a suitable service response with the appropriate spare parts to take care of potential fluid power system failures before they occur.

Embodiments of a diagnostic response system may, in accordance with the present invention, comprise: on board diagnostics equipment monitoring fluid power system parameters and warning of potential failure; a communication system transmitting this information to a central location such as a ground station/server; this web based ground station, or the like disseminating application specific information and preparing a suitable response; and a response network able to provide necessary on-site service, such as hose or component replacement, before the potential problem causes machine downtime.

Mobile diagnostics is a rapidly growing field and, through the use of the present systems and methods, is highly applicable to both mobile and stationary fluid power systems including mobile construction equipment, agricultural equipment, stationary industrial equipment and oil, gas and mining equipment.

The present invention leverages diagnostic and communication technology for use in fluid power systems. The introduction of diagnostic and communication systems into fluid power systems offers many opportunities for fluid power hose and fitting manufacturers and suppliers, as well as the end-users of mobile fluid power equipment.

Advantageously, the present diagnostic and communication systems and methods enable a hose and fitting manufacturer or supplier to: redefine their approach to distribution networks and to generate new revenue streams; better understand the operational usage of their products; obtain usage data that can be interpreted to provide improved warranty coverage; identify whether a product has been used outside of its designed parameters, thereby invalidating warranty coverage; provide data and market knowledge that will lead to new and improved products; improve its knowledge of hose testing and field use; correlate laboratory tests to service life; provide data to improve equipment performance; and/or better define product specifications based on actual measured performance.

As further advantages, the present systems and methods may enable an equipment manufacturer or supplier to: employ service indicators for fluid power systems and enable the offering a better indication of service life to end customers; to monitor systems and products after they have been shipped to end users, enabling, among other things, identification of equipment use outside design parameters that would nullify warranty; offer improved equipment performance and warranty coverage; and offer fast response service replacements for field applications; and improve designs and service life.

Preferably, the present invention will enable equipment end users to: schedule appropriate service and preventative maintenance activities in a timely manner; avoid costly breakdowns on site; monitor performance of their fleets, machines and operators; better assess critical spares inventories; and improve the utilization of machines.

Embodiments of the present diagnostic systems for fluid power systems might employ a plurality of pressure and temperature sensor units, each of the units disposed in a different area of a fluid power system, each of the units preferably monitoring each hose of a plurality of hoses in the area it is disposed. A control unit programmed with information identifying each hose being monitored preferably applies a cumulative hose damage algorithm for the identified hoses using monitored pressures and temperatures, and warns of out of specification pressures or temperatures or hose damage in accordance with the algorithm. To this end, the control unit continuously applies the hose damage algorithm using the monitored pressures and temperatures to estimate life used of a subject hose and warns when a hose is nearing the end of its life expectancy.

Preferably the control unit is pre-programmed with a number of variables for each hose. These variables might include a burst pressure for a particular hose, an operating pressure and cycle life at that pressure for that hose, a rated and/or maximum operating temperature for that hose, an alarm temperature for that hose, and/or the hose's location in the fluid power system. Preferably, damage calculated by the hose damage algorithm based on relative peak pressure can be modified or the damage calculated based on temperature can be modified, such as for application or environmental conditions. Also, or alternatively, the algorithm varies according to the information identifying a hose being monitored.

Thus, in operation, embodiments of the present diagnostic methods for fluid power systems might carry out the steps of monitoring pressure peaks and troughs in a fluid power system circuit and measuring fluid temperatures in the fluid power system. Damage to each of the hoses in the fluid power system caused by each pressure peak is calculated, based at least in part on the relative extent of the pressure peak and the temperature of fluid in each the hose. In particular, the calculations of damage to a hose caused by each pressure peak may be based at least in part on the relative magnitude of the pressure peak, as well as the temperature of fluid in the hose at the time of the pressure peak. These calculations also may take into account degree of flexing of the hose, the time in service of the hose, application conditions under which the hose is used, such as ambient temperature and/or ozone levels, and/or the like. These calculations may also be varied according to the hose being monitored. Preferably, the calculated damage is cumulated to estimate how much life of the hose has been utilized. Thus, monitoring and measuring continues in order to develop the estimate of how much life of the hose has been utilized. Subsequently, a warning of a service condition or out of specification condition for the fluid power system or a component of the fluid power system may be issued. This out of specification condition may be over pressure, over temperature or an expiration of service life for the hose. Also, in the event of failure of the control unit or failure of one or more sensors, a system warning might be issued. Alternatively or additionally, a general purpose processor-based device may be connected to the control unit for collecting information regarding a warning, condition of the diagnostic or fluid power systems, and/or operation of the diagnostic or fluid power systems.

A warning might take the form of a visual warning, such as lighting one or more warning lights. This warning might incorporate flashing the warning light(s) in predetermined sequences, indicating one or more particular ones of the service condition(s) or out of specification condition(s) for the fluid power system or a component of the fluid power system. However, preferably, the present systems and methods communicate the warning to a central location, remote from the fluid power system.

Hence, in operation, a fluid power component diagnostic and response system might employ the above discussed predictive algorithm to determine when a fluid power system component is nearing an end of its useful life or has failed and transmit information about the fluid power system component together with fluid power system component specifications, fluid power system details, and/or ground position of equipment mounting the fluid power system to a central location. In turn, information may be communicated from the central location, through a pre-determined communication channel, to a response unit, or the like, for responding to the information to replace the fluid power system component, preferably prior to failure of the fluid power system due to failure of the fluid power component. The present systems and methods may also transmit the aforementioned information and location when a fluid power component has failed. In such a case the response would comprise replacing the fluid power component to return the fluid power system to full/normal operation.

Alternatively, the information and position may be communicated to a fluid power component supplier, through the pre-determined communication channel, which may in turn manage the response. The response may be carried out by a response unit equipped with replacement fluid power components and repair or maintenance personnel, responding to the location and maintaining the fluid power system by replacing the component prior to failure of the fluid power system due to failure of the component. Hence, the information and position may be communicated to a fluid power component supplier, through the pre-determined communication channel and a response vehicle equipped with replacement fluid power components supplied by the fluid power component supplier and repair or maintenance personnel to be employed to respond to the warning.

Thus, embodiments of a method for carrying out the present invention comprises acquiring data from pressure and temperature sensors disposed in a fluid power system, analyzing the data in a failure algorithm to build a history of cumulative damage to hoses in the fluid power system, communicating an indication of potential imminent hose failure to a central location when a level of the cumulative damage indicates imminent failure of a hose in the fluid power system, analyzing information at the central location to determine an appropriate response, and transmitting, via a response network, information about the fluid power system including the location of the fluid power system and identification of the hose about to fail to a response unit. This method embodiment may also preferably include the response unit responding to the location and maintaining the fluid power system by replacing the component prior to failure, or the communication might include information that the hose has failed and the method might further comprise replacing the failed hose to return the fluid power system to normal operation.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
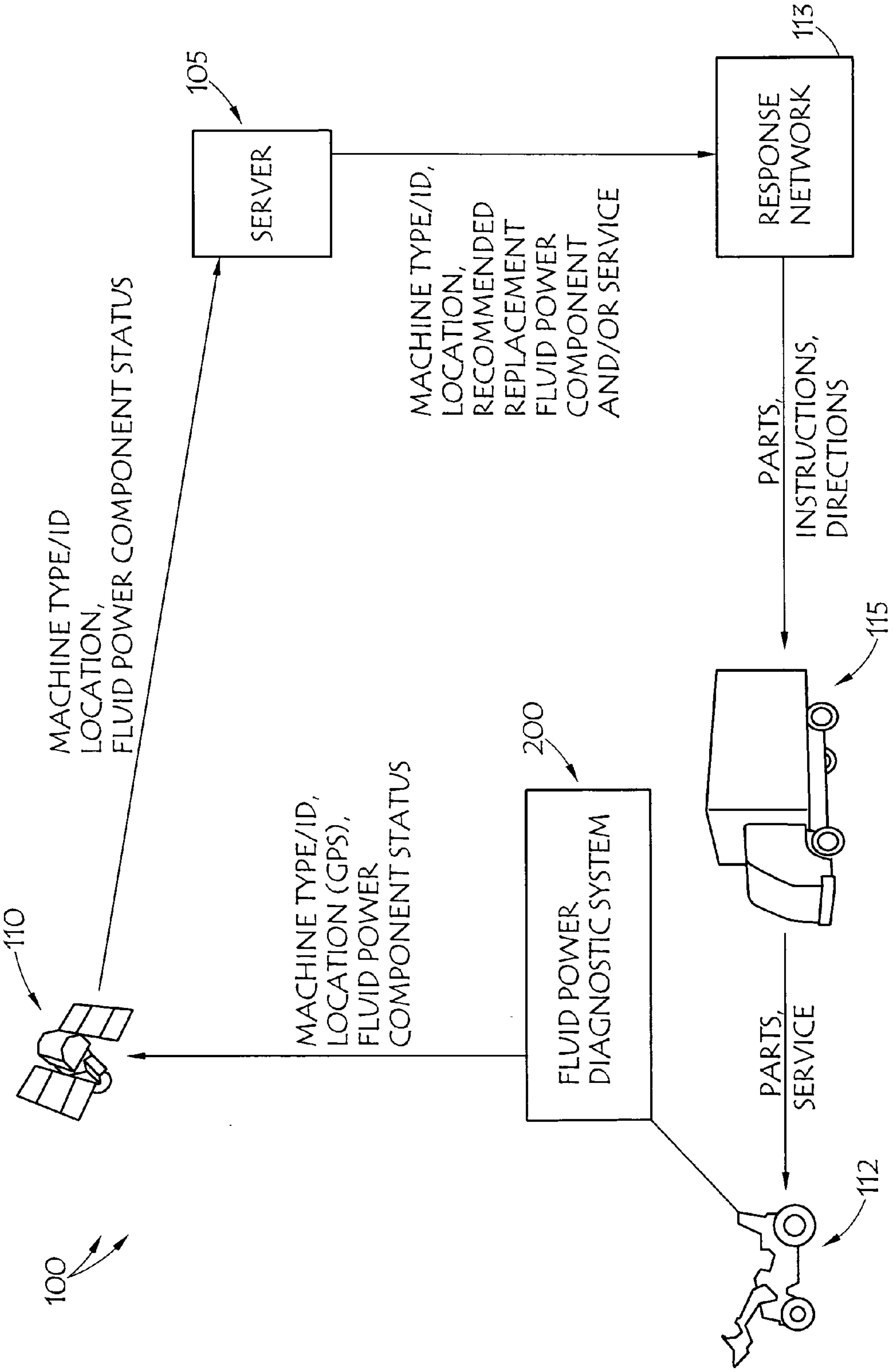
FIG. 1 is a diagrammatic illustration of an embodiment of a fluid power diagnostic and response system.

In FIG. 1, an embodiment of a fluid power diagnostic and response system 100 is illustrated. System 100 preferably employs a fluid power diagnostic system, such as fluid power diagnostic system embodiment 200 illustrated in FIG. 2. Preferably, systems 100 and 200 employ predictive algorithm 201 to indicate when a fluid power system component, such as one or more hoses is nearing the end of its useful life. Various embodiments of systems 100 and 200, such as those illustrated in FIGS. 1 and 2 employ modem 203 to transmit information about the status of the hose, together with various vehicle/equipment specifications, such as the type of machine, a machine identifier and/or various machine fluid power system details, and/or the machine's ground position to central location such as illustrated server 105, through a medium, such as through wireless communication medium 110, such as the illustrated satellite link. However, any wireless link, such as a conventional wireless phone and short messaging service network, a Wi-Fi network, including a Wi-Fi mesh network, and/or the like may be employed. Further, this information may be transferred using direct mechanisms such as wired communication systems. An example might be a LAN that communicates information about a stationary fluid power system to a connected computer, or the like. Server 105 preferably has been previously programmed with specific information about subject fluid power system 112, such as type of machine mounting the fluid power system, owner information, general position and serial number of the sensors and type and size of hoses being monitored, etc. Information, such as the aforementioned machine type and ground location, along with identification of a recommended replacement part (hose) and service procedures may be transmitted from central location 105 to response network 113 which might comprise a network of local fluid power component distributors, or the like. This communication may take place over a dedicated link, or over any other sort of appropriate communication medium, such as the Internet, a wireless and/or wire-line telephone system, or the like. Response network 113 preferably dispatches, or directs, service vehicle 115 (or the like) with the appropriate replacement parts to the specified location, with appropriate repair instructions, preferably before the fluid power component (hose) in question fails, thereby preventing downtime and/or other failure related problems.

Figure 2:
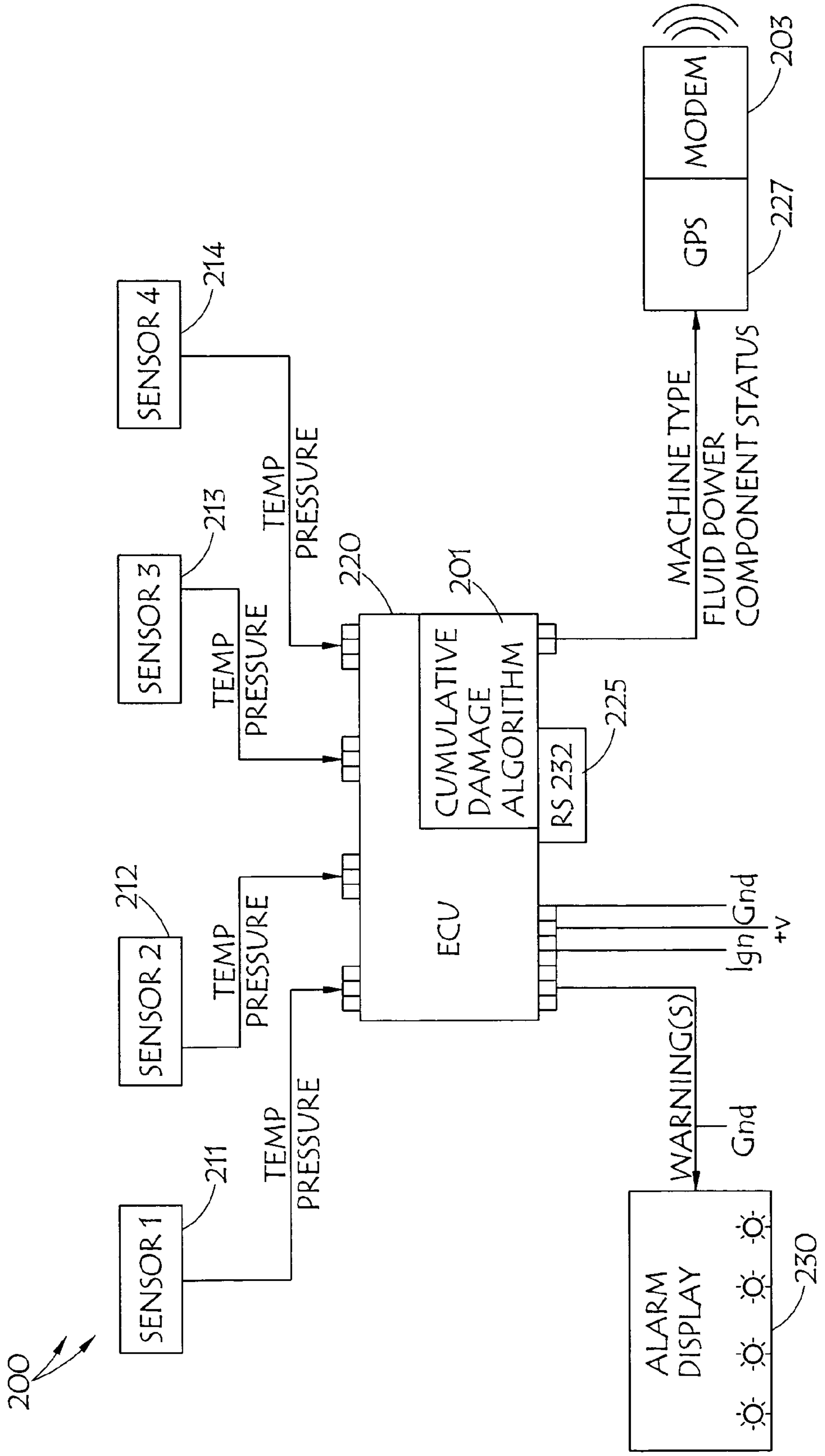
FIG. 2 is a diagrammatic illustration of an embodiment of a fluid power diagnostic system.

Diagnostic system 200 measures pressure amplitude and temperature within fluid power hoses, calculates damage and percentage of estimated life used of hoses and reports results via a communication channel such as satellite link 110, wireless communication link, etc. Hydraulic fluid and ambient air temperatures may also be measured and reported. The primary function of system 200 is to estimate the end of life of a fluid power hose, in real time, allowing for replacement of a hose before failure occurs. Preferably, system 200 employs cumulative damage algorithm 201 in a manner such as flowcharted in FIGS. 4 and/or 5 and comprises a plurality of pressure and/or temperature sensor units 211-214. Four sensors are shown in FIG. 2; however, one of ordinary skill in the art will appreciate that in accordance with the present invention any number of sensors, less than four, or certainly more than four can be employed by the present systems and methods. Preferably, each of the sensor units is disposed in a different area of a fluid power system, which will allow each sensor to monitor the performance of a number of components, such as a number of hoses. Diagnostic system 200 also preferably includes an electronic control unit (ECU) 220 programmed with information identifying each of the hoses being monitored. ECU 220 preferably applies hose damage algorithm 201 for each of the identified hoses using monitored pressures and temperatures. ECU 220 implements cumulative damage algorithm 201 and issues warning of out of specification (excessive) pressures or temperatures, hose damage, expiration of hose useful life, and or the like, in accordance with algorithm 201 for each of the hoses. Preferably, ECU 220 also warns of failure of the ECU itself and/or failure of one or more of sensors 201.

Various embodiments of diagnostic system 200 provides an interface, such as serial communications interface 225 for connecting a general purpose processor-based device, such as personal computer or laptop computer, to system 200 for collecting information regarding a warning, and/or to generally diagnose or monitor the operation of the subject fluid power system and/or diagnostic system 200 itself. Additionally, port 225 may be used to enter user programmed inputs, such as discussed below with respect to FIGS. 4 and/or 5, using the aforementioned general purpose processor-based device, or the like.

As noted above, diagnostic system 200 also preferably includes, or a least is associated with, modem 203 which may be used to communicate not only warnings concerning the fluid power system and its components, but also identification information about the equipment and/or equipment location, such as may be derived by GPS module 227, or other location means, such as any number of triangulation systems and methods. This information may be used to provide a preemptive repair response such as discussed above. Additionally, warnings may be communicated using warning lights 230 or other visual or auditory mechanism, such as a display screen. For example, the warning might incorporate flashing warning light(s) 230 in predetermined sequences, indicating one or more particular ones of the service condition(s) or out of specification condition(s) for fluid power system 112 or a component of the fluid power system.

Figure 3:
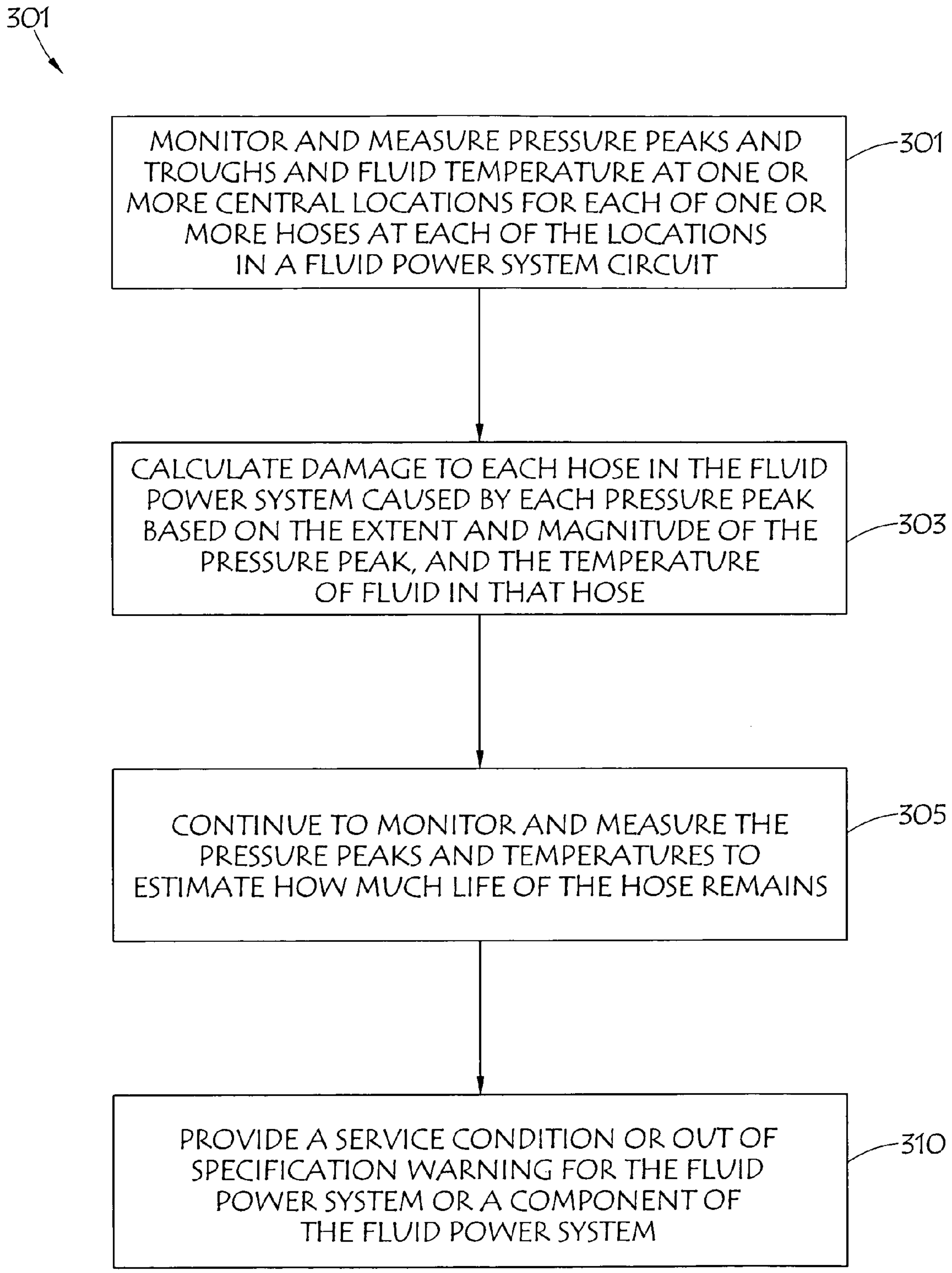
FIG. 3 is a flowchart of a method for fluid power diagnostics in accordance with the present invention.

FIG. 3 flowcharts method 300 for implementing diagnostic system 200. Method 300 may be implemented by a system such as illustrated in FIG. 2, and discussed above. Method 300 includes the steps of monitoring and measuring, such as by sampling the outputs of sensors 211-214, pressure peaks and troughs, and fluid temperature. The sampling to accomplish this monitoring and measuring is carried out at a frequency high enough to ensure all relevant data is being accurately measured, for example at a frequency sufficient to pick up every pressure peak and trough occurring in the fluid power system. As discussed above this measuring and monitoring is facilitated by disposing the sensors at a plurality of more-or less central locations associated with at least one, and preferably a plurality of hoses. At 303 damage to each hose in the fluid power system caused by each pressure peak is calculated. Preferably this calculation is based, at least in part, on the relative extent of the pressure peak and the temperature of fluid in the subject hose. As mentioned above and discussed in greater detail below, this calculation employs a cumulative hose damage algorithm, in a manner such as flowcharted in FIGS. 4 and/or 5. In accordance with method 300 the system may continue, at 305 to monitor and measure the pressure peaks and temperatures, so that the algorithm can develop an estimate of how much hose life remains for each particular hose. When the algorithm determines that a service condition exists, that a component in the fluid power system is operating out of specification, or that failure of a component of the fluid power system is imminent a warning is issued at 310. As discussed above, and in greater detail below, the warning may be issued to a central location, such as may be a part of a fluid power diagnostic and response system 100. There, a response can be formulated in accordance with the present systems and methods. Additionally, or alternatively the warning may be communicated to an equipment operator, such as via alarm telltale lights 230, shown in FIG. 2. In accordance with the present systems and methods warning 310 may be issued to a connected PC or PDA, transmitted to a cell phone, via a CANbus of the machine mounting the fluid power system, or in any other appropriate manner. Preferably, even absent a warning event, data from the diagnostics algorithm, plus other important information such as position of the machine, machine serial number, information relating to the health of the sensors, cabling and electronic control unit to which the sensors are attached, and location of sensors, is periodically transmitted via the communication system to the server.

Figure 4:
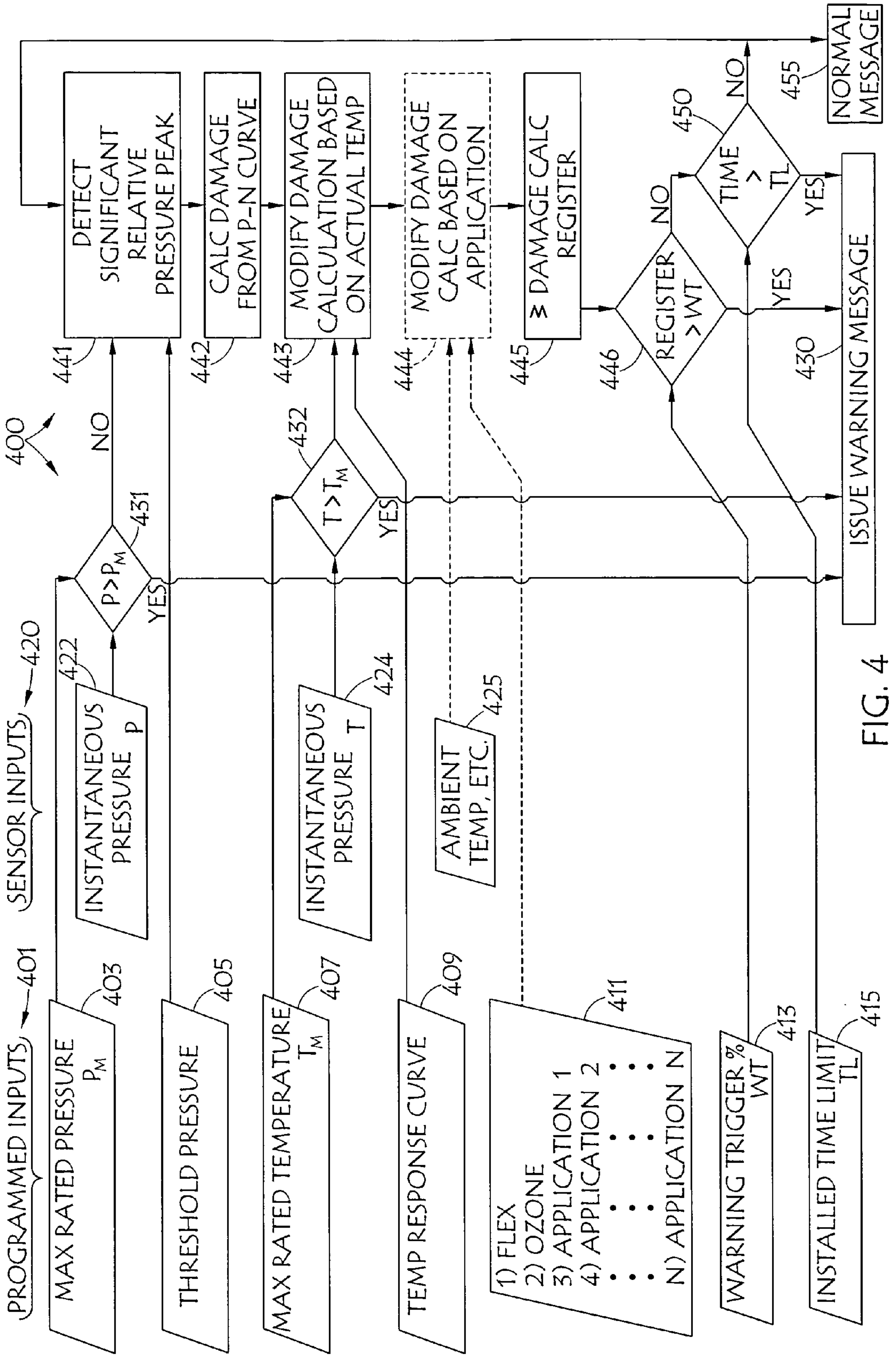
FIG. 4 is a flow diagram that includes an embodiment of a fluid power hose damage algorithm that may be employed in accordance with by the present systems and methods.

An embodiment of cumulative damage algorithm 201 is flowcharted in FIG. 4. As noted above, cumulative damage is an industry wide understood way of estimation of hose life. Cumulative damage formulae exist and are specified in SAE J1927. The SAE cumulative damage formulae estimate the cumulative damage of a hose based upon pressure impulse exposure history. This pressure history tracks time oriented variations of internal pressure in a fluid power system (hose assembly). It may be tabulated by listing a sequence of relative maximums and minimums from recorded pressure, versus time, data. Significant maximums and minimums are called peaks and valleys. A peak is defined as a maximum both preceded and followed by a minimum less than the peak by a specified amount or threshold (differential pressure). A valley is defined as the smallest minimum between significant peaks. It is possible for peaks to be lower than valleys in cases where they are not adjacent. Likewise, valleys could be greater than nonadjacent peaks. The threshold (differential pressure) is the magnitude of pressure difference (differential pressure) between a maximum and adjacent minimum in a pressure history that is considered significant. This threshold (differential pressure) is chosen and typically is at least 35% of the hose rated pressure. If both the differential pressure before and after a maximum are equal to or greater than the threshold, then that maximum is defined to be a peak in the pressure history. Having thus defined peak pressure, SAE J1927 employs formulae that estimate cumulative damage based on zero to peak pressure.

SAE J1927 proposes a method of assessing hose life based on P-N curves and pressure history but has limitations in that it assumes all significant pressure peaks return to zero, which is rarely the case, resulting in overestimation of damage accumulation. The present algorithm has the capability of estimating damage for all pressure peak excursions that occur, particularly for relative pressure peaks where the trough is greater than zero. SAE J1927 ignores not only base fluid power system pressure, but also the fundamentally critical aspects of temperature variation on hose life and application conditions such as severity of hose flexing, hose twist, external conditions of heat, ozone, etc. As noted, the purpose of SAE J1927 is to "provide the hydraulic system specialist with a procedure which will assist in the selection and use of high pressure wire reinforced hydraulic hose." It seeks to provide a means to predict hose life for equipment design purposes, and out of necessity this prediction assumes that system conditions will continue throughout the life of the machine, which is clearly not necessarily the case because of real-world unpredictable changes in duty cycles. Conversely, the purpose of the present algorithm is to provide a real time indication of the amount of hose life used based on actual operating conditions throughout the life of the machine.

While SAE J1927 recognizes that "other factors" such as long-term exposure to extreme limits or high levels of internal temperature could affect the overall hose assembly life, temperature "for all intents and purposes, have not been considered" in the SAE J1927 cumulative damage analysis procedure. However, in accordance with the present invention, it has been determined that fluid temperature, even moderately elevated levels can have an effect on hose life in a fluid power system, over time. For example, it has been empirically derived in the development of the present invention that generally speaking, damage to a hose increases as fluid temperature increases. Thus, while in accordance with the present systems and methods the SAE J1927 cumulative damage formula may be viewed as a starting point for the present diagnostic and response systems and methods for use in fluid power systems, SAE J1927 makes erroneous assumptions about product integrity and the relative effects of differing types of damaging event. The algorithm for cumulative damage used by the present systems and methods is based on statistical testing data and incorporates factors not considered in the SAE formulae. These factors, in addition to significant pressure events, include oil temperature, application information such as flexing, length of time the hoses have been installed, over pressure, over temperature, ambient temperature, anticipated ambient ozone levels, and/or the like.

In order to predict hose life in accordance with the present invention, several variables are preferably pre-defined, such as at installation. The present systems and methods calculate cumulative damage independently for every hose in a fluid power system. Thus, when the system is installed, the ECU is preferably programmed with information related to the hoses it is monitoring and to apply the correct damage algorithm for each hose being monitored. In order to estimate end of life reliably, real-time pressure and temperature measurements are employed along with the installation information. Variables which may be defined at installation might include, for each particular hose: a maximum operating temperature; an impulse point, which may be expressed in a percentage of operating or maximum pressure; a burst point, which may also be expressed in a percentage of operating or maximum pressure; the number of pressure cycles until failure; pressure rating; a peak threshold; the flex the hose is subjected to in the installation; a temperature response curve; and the like.

FIG. 4 is a flow diagram that includes an embodiment of fluid power hose damage algorithm 201 that may be employed with illustrated embodiment 400 of the present methods. User programmed inputs 401 employed by the present systems and methods may include: maximum rated pressure ($P_m$) 403 for each hose; threshold pressure 405 that would indicate a pressure peak for a particular hose, usually derived from a percent of the rated pressure for a hose; maximum rated temperature ($T_m$) 407 for each hose; temperature response curve 409 for each hose; additional variables 411, such as application specific data such as the amount of flex a particular hose is subject to during operation of the subject fluid power system; warning trigger (WT) 413, which may be based on a percent of the useful life of a hose, which has been used; and installed time limit (TL) 415, a time-based limit on the useful life of a hose, such as may be based solely on the age of the hose. User programmed inputs 401 may be entered using port 225, or the like, employing a general purpose processor-based device or similar tool. Sensor inputs 420 employed by the present systems and methods may include instantaneous pressure (P) 422 and instantaneous temperature (T) 424, which may be collected from sensors 211-214, or the like. Additional sensor inputs 425, such as ambient temperature may be provided by these or other sensors, as well.

In operation, a warning message may be issued at 430 when it is determined at 431 that instantaneous pressure 422 has exceeded maximum rated pressure 403 for a hose. Similarly, a warning message may be issued at 430 when it is determined at 432 that instantaneous temperature 424 has exceeded maximum hose rated temperature 407.

The embodiment of algorithm 201 flowcharted in FIG. 4 can be generally described as encompassing steps 441-446, for issuing a warning at 430. As shown, measured instantaneous pressure 422 and input threshold pressure 407 are used at 441 to detect significant relative pressure peaks. Detected significant relative pressure peaks are used at 442 to calculate hose damage, for each relative peak, using a P-N curve for the subject hose. At 433, this damage calculation may be modified based on the instantaneous temperature 424, as applied to the calculation in accordance with temperature response curve 409. Optionally, at 444, the modified calculation may be further modified by other inputs, such as input application factor 411 (i.e. flex) and/or ambient conditions, such as temperature or ozone levels. The calculated modified damage is summed with prior calculated modified damage for a particular hose at 445, and stored. At 446 this summed damage is compared to warning trigger 413. If the summed damage for a particular hose exceeds the warning trigger then a warning message, for that hose is issued at 430.

At 450 a determination is made whether age limit 415 for the particular hose has been exceeded. If so, a warning message at 430 is issued. If neither cumulative damage warning trigger threshold 413, nor installed life limit 415 have been exceed, at 446 and 450, respectively, a normal message reporting cumulative damage, sensor readings, and the like may be issued at 455 and the cumulative damage calculations may return to step 441.

Figure 5:
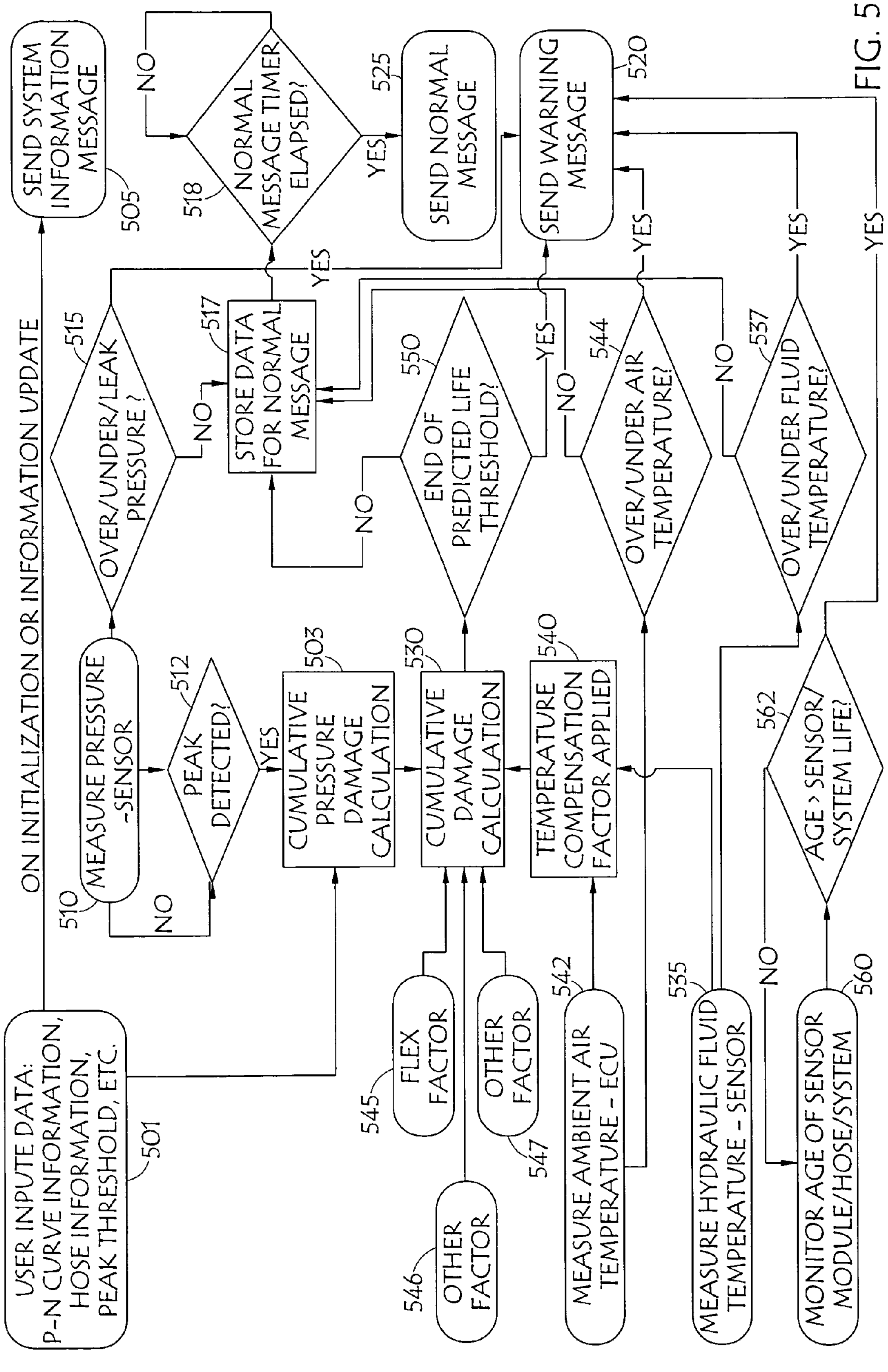
FIG. 5 is a diagram of flow of data in embodiments of the present system for use by various embodiments of the present algorithm.

FIG. 5 is a more detailed chart of flow of data in embodiments of the present system for use by various embodiments of the present algorithm. At 501 user input data, such as P-N curve information, hose information, peak threshold, etc, are input to the ECU for employment in cumulative pressure damage calculations at 503. Also, preferably, this user input data is forwarded at 505 to a central data repository, such as central server 220. The user input data may be forwarded to the central server at 505 upon initialization, or as part of an information update, such as a periodic update, or when a hose is replaced.

At 510 pressure is measured, such as by sensors 211-214. At 512 a determination is made, preferably by the ECU using a pressure sampled from the measurement at 510, as to whether a pressure peak is detected. If a pressure peak has been detected at 512, this pressure peak, and possibly its duration, is provided as an input to the cumulative pressure damage calculation carried out at 503. Regardless of whether or not a peak is detected at 512, pressure measurement at 510 continues. Additionally, the pressure measurement at 510 is used at 515 to evaluate whether the pressure in a hose is over pressure, or under pressure which may indicate a leak. If the pressure is sufficient or a leak is detected at 515, a warning may be issued at 520. However, if the pressure is determined at 515 to be within normal parameters the measurement may just be stored at 517, for transmission as part of a periodic normal operation message at 525, which may be transmitted based on an elapsed time tracked at 518. Cumulative pressure damage calculations are carried out at 503 using relative peaks detected at 512 and P-N curve information provided at 501. The results of the cumulative pressure damage calculations at 503 are provided as an input to an overall cumulative damage calculation at 530.

At 535 fluid temperature is measured, such as by sensors 211-214. This temperature measurement may be employed at 540 as an input to a temperature compensation factor to be applied in cumulative damage calculation 530. Fluid temperature measurements at 535 may also be evaluated at 537 to determine whether the fluid temperature is above or under a threshold, if so, a warning may be issued at 520. However, if the fluid temperature is determined to be within normal parameters at 537, the measurement may be stored at 517, for transmission as part of a periodic normal operation message at 525.

Similarly, at 542 ambient air temperature may be measured. This ambient temperature measurement may alternatively be employed at 540 as an input to a temperature compensation factor to be applied in cumulative damage calculation 530. Air temperature measurements at 542 may also be evaluated at 544 to determine whether the ambient temperature is above or under a threshold, if so, a warning may be issued at 520. However, if the ambient temperature is determined to be within normal parameters at 544 the measurement may be stored at 517, for transmission as part of a periodic normal operation message at 525.

The cumulative damage calculation at 530 modifies the results of cumulative pressure damage calculation 503 by applying a temperature compensation factor derived from the fluid temperature measured at 535, such as multiplying the cumulative pressure damage calculation result by a number that reflects the relative additional damage, or reduced damage, imparted by the temperature of the fluid the particular hose is handling. This, number may, for example, be greater than one for fluid temperatures above a maximum rated temperature for that hose and less than one for fluid temperatures below the maximum rated temperature for that hose Other possible inputs, 545-547 to cumulative damage calculation 530, might include hose movement factors, such as flex (545) or twist, and/or external conditions of heat, ozone, etc. to which a hose is subjected. For example, flex factor 545, or other factors may be applied to the cumulative pressure damage calculation, such as by further multiplying the modified cumulative pressure damage calculation result by a another number (usually greater than one) that reflects the relative additional damage imparted by the flexing of the particular hose, or the like.

The result of these modifications to the cumulative pressure damage for a particular hose is summed with previous results for that particular hose to provide a total cumulative damage. At 550 the total cumulative damage calculation for a particular hose is evaluated to determine if the hose has reached a threshold that would indicate the hose has reached the end of its useful life. If the hose has reached an end of its predicted useful life, then a warning message may be issued at 520, if not, the total cumulative damage for that particular hose may be stored at 517, for transmission as part of a periodic normal operation message at 525.

Additionally, at 560 the age of a particular hose, the fluid power system, a particular sensor of the diagnostic system, the diagnostic system itself, and/or the like, may be monitored. If the age of one of these components or systems is determined at 562 to have reached a pre-determined threshold applicable to the particular component or system, then a warning may be issued at 520.

Figure 6:
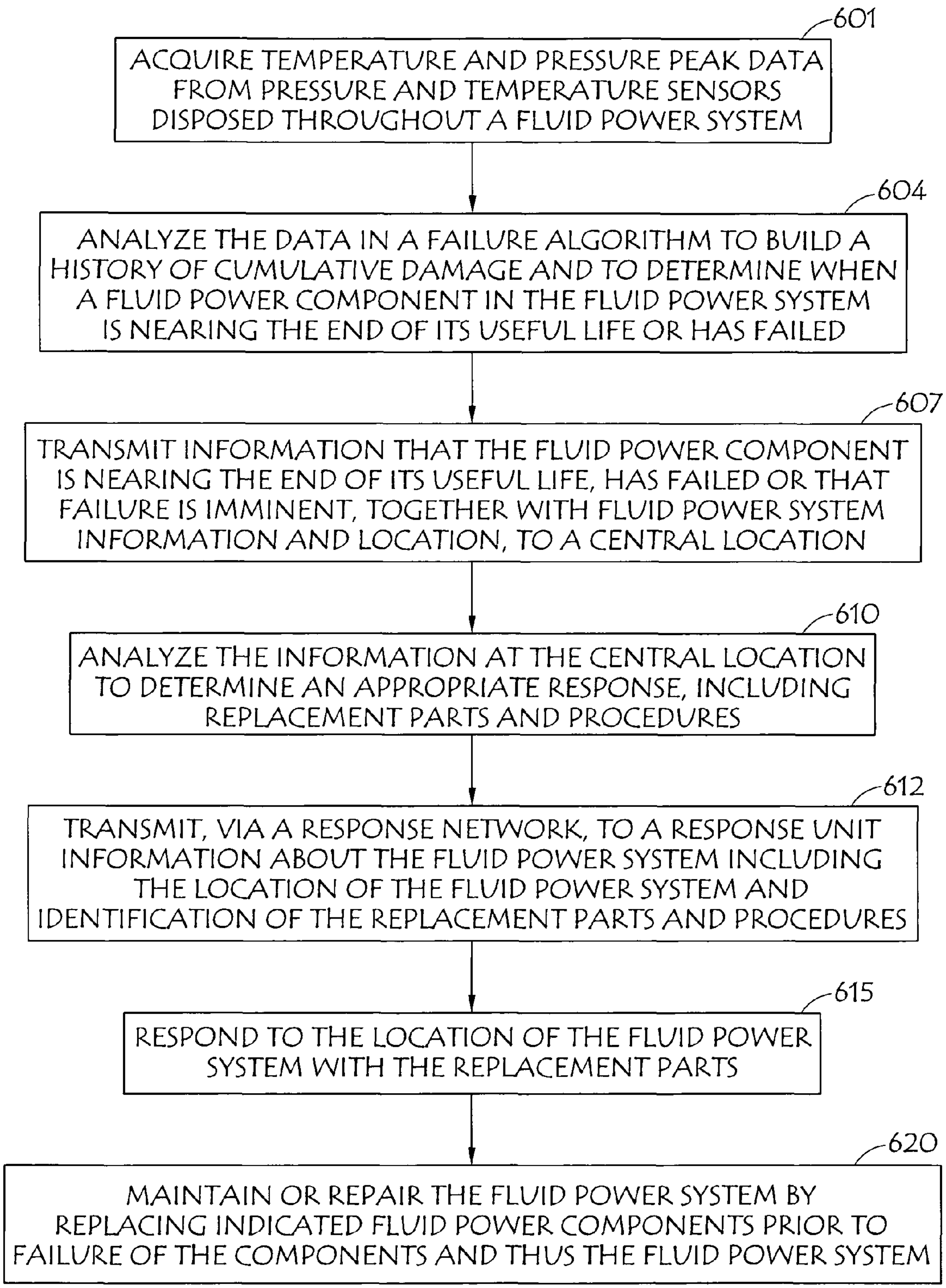
FIG. 6 is a flowchart of a method for fluid power diagnostics and response in accordance with the present invention.

As noted, FIG. 6 is a flowchart of method 600 for fluid power diagnostics and response in accordance with the present invention, such as may be implemented by response system 100, illustrated in FIG. 1. At 601 temperature and pressure peak data are acquired from pressure and temperature sensors (211-214) disposed throughout a fluid power system Analysis of the data at 604 in a failure algorithm, such as discussed above, is used to build a history of cumulative damage and to determine when a fluid power component in the fluid power system is nearing the end of its useful life, or has failed. Information that the fluid power component is nearing the end of its useful life, has failed or that failure is imminent, is transmitted at 607, together with fluid power system information and location, to a central location, such as to server 105 illustrated in FIG. 1. The information is preferably analyzed (610) at the central location to determine an appropriate response, including replacement parts required to address any potential failure and procedures for maintaining the fluid power system and/or replacing the parts. At 612 a response network is employed to transmit information about the fluid power system, including the location of the fluid power system and identification of the replacement parts and procedures, to a response unit, such as service truck 115, shown in FIG. 1. For example, dependent on the type of information received from the diagnostic system a suitable service response can be automatically generated. A typical response might be to transmit information to a local distributor or service agent who can visit the site of the machine and effect preventative maintenance before a failure actually occurs. Another response might be for a supplier to fabricate and dispatch replacement parts direct to the service agent or application site. At 615 the response unit responds to the location of the fluid power system with the replacement parts, and at 620 repair and/or maintenance of the fluid power system, such as by replacing indicated fluid power components prior to failure of the component, is carried out, thus averting failure of the fluid power system. Preferably, following replacement of the hose the ECU is reset in such a manner that cumulative damage to the new hose is calculated anew.

In accordance with the present systems and methods an aftermarket installed diagnostics system may communicate with a centralized server and repair and maintenance data may be distributed to a parts distributor to advise the specific assemblies, machine, and location in need of predictive maintenance. Alternatively, the distributor might operate out of a mobile unit, such as the aforementioned response unit with a prescribed inventory of replacement parts, which could be replenished as they are used. In an alternative environment, the diagnostic system may be installed as original equipment and the centralized server could be maintained by the manufacturer, or its dealers, such that decentralized data collection could be considered for OEM's with significant dealership and aftermarket presence.

As a further alternative, the present systems and methods may be employed to monitor fluid power system work rates, or the like. Hence, the present systems and methods may be used to optimize machine output, even operator to operator. For example, the system can be configured to determine the percentage of working time the machine is used or the rate of work being undertaken. Alternatively or additionally, other fluid power system data may be evaluated by the ECU, oil degradation for example. In particular, input to the ECU or sensor input can be any characteristic, attribute or factor that can be monitored in such a manner as to provide a voltage signal that varies based on the characteristic, attribute or factor, such as oil opaqucy, engine misfire, high coolant temperature, battery charge, tire pressure, etc.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:

monitoring pressure peaks and troughs in a fluid power system;

measuring temperature in said fluid power system;

calculating damage to each of one or more hoses in said fluid power system caused by each pressure peak based on an extent of the pressure peak and the temperature of fluid in each said hose;

continuing said monitoring and measuring to estimate how much life of the hose has been utilized; and warning a service condition or out of specification condition for said fluid power system or a component of said fluid power system.

2. The method of claim 1, wherein said calculating comprises calculating said damage to a hose caused by each pressure peak, based at least in part on a relative peak of the pressure, and temperature of fluid in the hose at the time of the pressure peak.

3. The method of claim 1 wherein said calculating takes into account degree of flexing of said hose.

4. The method of claim 1 wherein said calculating takes into account time in service of said hose.

5. The method of claim 1 further comprising cumulating the calculated damage to estimate how much life of the hose has been utilized.

6. The method of claim 1, wherein said warning further comprises warning of failure of a control unit performing said calculating or failure of one or more sensors providing said monitoring and measuring.

7. The method of claim 1, wherein said out of specification condition is over pressure.

8. The method of claim 1, wherein said out of specification condition is over temperature.

9. The method of claim 1, wherein said out of specification condition is past service life.

10. The method of claim 1, further comprising:

connecting a general purpose processor-based device to a control unit performing said calculating and said warning for collecting information regarding a warning.

11. The method of claim 1 further comprising communicating said warning to a central location remote from said fluid power system.

12. The method of claim 1 further comprising:

deploying a plurality of pressure and temperature sensor units to carry out said monitoring and measuring, each of said units deployed in a different area of said fluid power system, each of said sensors monitoring and measuring pressure and temperature in each of a plurality of hoses in the area it is disposed; and identifying each of the hoses being monitored by each of said sensors.

13. The method of claim 12, wherein said calculating varies according to the hose being monitored.

14. The method of claim 1, wherein said warning comprises a visual warning.

15. The method of claim 14, wherein said visual warning comprises flashing at least one warning light in predetermined sequences, indicating one or more particular one of said service conditions or out of specification condition for said fluid power system or a component of said fluid power system.

16. The method of claim 15, wherein said service condition comprises a warning that a particular hose is nearing the end of its useful life.

17. The method of claim 15, wherein said out of specification condition comprises an over pressure condition.

18. The method of claim 15, wherein said out of specification condition comprises an over temperature condition.

19. The method of claim 15, wherein said out of specification condition comprises a warning system fault.

20. The method of claim 15, wherein said out of specification condition comprises a past service life condition for one or more fluid power system components.

21. A system comprising;

a plurality of pressure and temperature sensor units, each of said units disposed in a different area of a fluid power system, each of said units monitoring each hose of a plurality of hoses in the area it is disposed; and a control unit programmed with information identifying each hose being monitored, said control unit applying a hose damage algorithm for the identified hoses using monitored pressures and temperatures, and warning of out of specification pressures or temperatures or hose damage in accordance with said algorithm, wherein said control unit is programmed with at least one variable for each hose, wherein said variable for each hose is a normal operating temperature for that hose.

22. The system of claim 21, wherein said variable for each hose is a burst pressure for that hose.

23. The system of claim 21, wherein said variable for each hose is an operating pressure for that hose.

24. The system of claim 21, wherein said variable for each hose is an alarm temperature for that hose.

25. The system of claim 21, wherein said hose damage algorithm is a cumulative hose damage algorithm.

26. The system of claim 21, wherein said control unit also warns of failure of the control unit or failure of one or more sensors.

27. The system of claim 21, wherein said out of specification condition is over pressure.

28. The system of claim 21, wherein said out of specification condition is over temperature.

29. The system of claim 21, further comprising:

means for connecting a general purpose processor-based device to said system for collecting information regarding a warning.

30. The system of claim 21, further comprising:

means for communicating said warning.

31. The system of claim 30, wherein said means for communicating said warning comprises means for communicating said warning to a central location remote from said system.

32. The system of claim 30, wherein said means for communicating said warning comprises at least one means for providing a visual warning.

33. The system of claim 32, wherein said at least one means for providing a visual warning comprises at least one warning light that indicates a particular fault condition by flashing in a predetermined sequence.

34. The system of claim 33, wherein said fault condition comprises a hose service condition, warning that such hose is nearing the end of its useful life.

35. The system of claim 33, wherein said fault condition comprises an over pressure condition.

36. The system of claim 33, wherein said fault condition comprises an over temperature condition.

37. The system of claim 33, wherein said fault condition comprises a system fault.

38. The system of claim 33, wherein different fault conditions can be set for each individual hose.

39. The system of claim 21, wherein said hose damage algorithm calculates damage to the hose caused by each measured pressure peak, based at least in part on the relative level of the pressure peak, and the temperature of fluid in the hose.

40. The system of claim 21, wherein said control unit continuously applies said hose damage algorithm using said monitored pressures and temperatures to estimate a life used of a subject hose and warns when a hose is nearing the end of its life expectancy in accordance with said algorithm.

41. The system of claim 21, wherein said algorithm varies according to said information identifying a hose being monitored.

42. The system of claim 21, wherein said information identifying a hose being monitored includes said hose's location in said fluid power system.

* * * * *